Oct. 3, 1961  G. A. RIKHOFF  3,002,220
MEAT BALL MAKER
Filed July 10, 1959
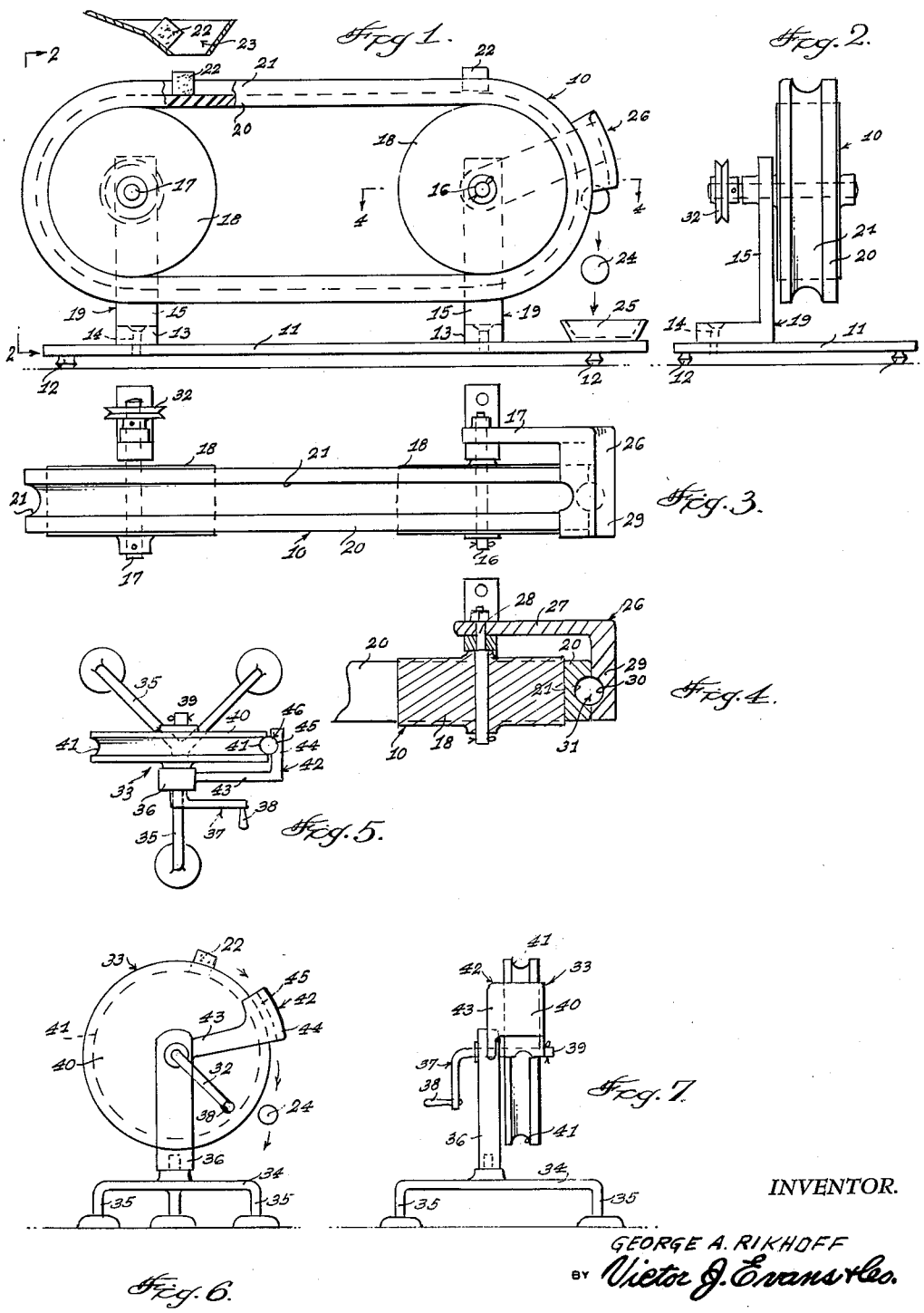
INVENTOR.
GEORGE A. RIKHOFF
BY Victor J. Evans & Co.
ATTORNEYS

United States Patent Office 3,002,220
Patented Oct. 3, 1961

3,002,220
MEAT BALL MAKER
George A. Rikhoff, Rte. 2, Box 160, Pueblo, Colo.
Filed July 10, 1959, Ser. No. 826,167
1 Claim. (Cl. 17—32)

This invention relates to a device for converting or transforming a cube shaped article into a spherical shaped article.

The object of the invention is to provide a device which is especially suitable for converting a cube shaped article such as a cube shaped piece of meat into a spherical shaped article such as a round or spherical meat ball.

Another object of the invention is to provide an article forming or shaping device which is especially suitable for use in forming or providing a plurality of spherical members or articles such as spherical shaped meat balls which may be used for any desired purpose.

A further object of the invention is to provide an article shaping device which is extremely simple and inexpensive to manufacture.

Other objects and advantages will be apparent during the course of the following description.

In the accompanying drawing, forming a part of this application, and in which like numerals are used to designate like parts throughout the same:

FIGURE 1 is a side elevational view of the article shaping device of the present invention, with parts broken away and in section.

FIGURE 2 is an end elevational view of the device.

FIGURE 3 is a top plan view.

FIGURE 4 is a fragmentary sectional view and taken on the line 4—4 of FIGURE 1.

FIGURE 5 is a plan view of a modification.

FIGURE 6 is a side elevational view of the device of FIGURE 5.

FIGURE 7 is an end elevational view of the device shown in FIGURES 5 and 6.

Referring in detail to the drawings, and more particularly to FIGURES 1 through 4, of the drawings, the numeral 10 indicates an article shaping or forming device which is especially suitable for use in forming spherical or round meat balls from cube shaped pieces of meat which may be previously ground up. The device 10 includes a horizontally disposed base 11 which may be supported on members 12, and the numeral 19 designates each of the pair of L-shaped legs which have lower horizontally disposed portions 13 fastened to the base 11 by means of securing elements 14. Each leg 19 further includes a vertically disposed portion 15, and the portions 15 serve to support first and second horizontally disposed spaced parallel bars or shafts 16 and 17. A pulley 18 is mounted on each rod 16 and 17.

Trained over the pair of pulleys 18 is an endless belt 20, and the belt 20 is provided with a longitudinally extending arcuate or curved groove 21 which is semi-circular in cross section. The numeral 22 indicates a cube shaped article such as a cube shaped piece of meat which is adapted to be deposited on the moving belt 20 from a suitable source of supply such as the hopper 23. The numeral 24 indicates a spherical article which is formed by the device of the present invention and the article 24 may be a spherical meat ball which is collected in a container or tray 25, and the meat balls 24 can be used for any desired purpose, as for example in various types of food preparations.

As shown in FIGURES 3 and 4 for example there is provided an L-shaped bar 26 which includes a first portion 27 which is fastened as at 28, and the bar 26 includes a right angularly arranged second portion 29 which is provided with a semi-circular recess 30. The recess 30 is adapted to coact with the semi-circular groove 21 in the belt 20 so as to define a circular opening 31, FIGURE 4. Thus, as the cube-shaped article or meat ball 22 is forced through the circular opening 31 it will emerge as a spherical article or meat ball 24, which has the desired configuration or shape. The endless belt 20 may be driven by any suitable means, as for example a pulley 32 may be connected to one of the rods 16 or 17, and the pulley 32 may be driven by means of a suitable endless belt which can be connected to a motor. Or, if desired, a hand crank can be provided for providing power for rotating the belt 20.

Referring now to FIGURES 5, 6, and 7 of the drawings, there is illustrated a modified article shaping and forming device which is indicated by the numeral 33 generally, and the device 33 includes a horizontally disposed base 34 which is supported on members 35. Extending upwardly from the base 34 and connected thereto is a vertically disposed member 36. The numeral 37 indicates a hand crank which includes a manually operable portion 38 as well as a shaft portion 39. A pulley or wheel 40 is mounted on the shaft portion 39, and the wheel 40 is provided with a continuous semi-circular groove 41 in its outer periphery. The numeral 42 indicates an L-shaped bar which includes a first portion 43 which is affixed to the standard 36 and the bar 42 further includes a right angularly second portion 44 which is provided with a circular recess 45. The recess 45 coacts with the groove 41 to define a circular opening 46. Thus, as an article such as a cube shaped meat ball 22 is forced through the circular opening 46, the article will emerge in a spherical formation as indicated by the numeral 24.

From the foregoing, it is apparent that there has been provided a device which is especially suitable for shaping articles such as meat balls so that the completed article will have a spherical formation or shape. When using the device 10 of FIGURES 1 through 4, cube shaped articles or meat balls 22 are discharged from the hopper 23 to the moving belt 20, and the belt 20 rotates in a clockwise direction, FIGURE 1. This causes the cube shaped meat pieces 22 to move from left to right in FIGURE 1 along the portion of the moving belt 20, and these cube shaped members 22 will then pass through the circular opening 31 which is defined between the circular groove 21 and semi-circular recess 30 so that the articles 22 will be compressed and shaped and will have a spherical formation as indicated by the numeral 24 when they emerge from the opening 31. These spherical articles or meat balls 24 are adapted to be received in a container 25 and this container 25 can be emptied when desired or required.

The device 10 may be power operated, as for example a suitable electric motor can be used for supplying power to a pulley 32 which roates the endless belt 20 through the previously described mechanism.

In the modification shown in FIGURES 5, 6, and 7, a hank crank 37 is adapted to be used for imparting rotary motion to a wheel 40. Thus, by arranging the parts as shown in FIGURES 5, 6, and 7 and supplying cube shaped articles 22 to the continuous semi-circular groove 41 in the wheel 40, it will be seen that by rotating the wheel 40 the cubes 22 will travel in a clockwise direction, FIGURE 6, and this cube will be forced through the circular opening 46, so that the spherical article 24 which emerges from the opening 46 will have the desired shape or configuration.

The parts can be made of any suitable material and in different shapes or sizes.

The device can be constructed so that the belt or wheel has more than one groove so that more than one meat ball can be made at the same time if desired. It will be seen that according to the present invention a cube-shaped article is transformed into a spherical shaped article. In use the squares of meat are fed from the hopper, such as the hopper 23 onto the moving belt 20 and as the belt turns the squares are forced into the opening 46 so as to make the meat into round balls. Instead of using the arrangement as shown in FIGURES 1 through 4, a stainless steel wheel 40 may be used. The various parts of the device may be readily disassembled, as for example when the apparatus is to be cleaned.

Minor changes in shape, size and rearrangement of details coming within the field of invention claimed, may be resorted to in actual practice if desired.

I claim:

A device of the character described comprising a horizontally disposed base, support members depending from said base, a standard extending upwardly from said base, a crank embodying a shaft portion projecting through said standard, said crank embodying a manually operable handle portion, a wheel on said shaft portion, said wheel having a continuous semi-circular groove in its outer periphery, an L-shaped bar embodying a first portion connected to said standard, said bar further embodying a right angularly arranged second portion which has a semi-circular recess for coacting with said groove to define a circular opening, whereby material which emerges from the opening will have a spherical shape.

References Cited in the file of this patent

UNITED STATES PATENTS

| | | |
|---|---|---|
| 2,181,737 | North | Nov. 28, 1939 |
| 2,542,673 | Hedwall | Feb. 20, 1951 |

FOREIGN PATENTS

| | | |
|---|---|---|
| 91,066 | Norway | Feb. 24, 1958 |